US010230651B2

(12) United States Patent
Yang

(10) Patent No.: US 10,230,651 B2
(45) Date of Patent: *Mar. 12, 2019

(54) EFFECTIVE INTRA-FRAME REFRESH IN MULTIMEDIA COMMUNICATIONS OVER PACKET NETWORKS

(71) Applicant: Dialogic Corporation, Montreral (CA)

(72) Inventor: Kyeong Ho Yang, Freehold, NJ (US)

(73) Assignee: DIALOGIC CORPORATION, Montreal Quebec (CA)

( * ) Notice: Subject to any disclaimer, the term of this patent is extended or adjusted under 35 U.S.C. 154(b) by 37 days.

This patent is subject to a terminal disclaimer.

(21) Appl. No.: 15/486,566

(22) Filed: Apr. 13, 2017

(65) Prior Publication Data

US 2017/0279729 A1 Sep. 28, 2017

Related U.S. Application Data

(63) Continuation of application No. 14/541,569, filed on Nov. 14, 2014, now Pat. No. 9,654,405.

(51) Int. Cl.
H04N 7/14 (2006.01)
H04L 12/823 (2013.01)
H04L 12/927 (2013.01)
H04L 12/911 (2013.01)
H04L 29/06 (2006.01)
(Continued)

(52) U.S. Cl.
CPC ............ *H04L 47/32* (2013.01); *H04L 47/743* (2013.01); *H04L 47/801* (2013.01);
(Continued)

(58) Field of Classification Search
CPC ..... H04L 47/32; H04L 47/743; H04L 47/801; H04N 7/147
See application file for complete search history.

(56) References Cited

U.S. PATENT DOCUMENTS

| 2004/0114576 | A1* | 6/2004 | Itoh | H04L 1/0009 370/352 |
| 2013/0170435 | A1* | 7/2013 | Dinan | H04L 45/50 370/328 |
| 2013/0219443 | A1* | 8/2013 | Argyropoulos | H04N 17/00 725/109 |

OTHER PUBLICATIONS

Wiegand, Sullivan, Bjontegaard, Luthra, "Overview of the H.264/ AVC Video Coding Standard", IEEE Transactions on Circuits and Systems, vol. 13, No. 7, Jul. 2003, pp. 560-576.

(Continued)

*Primary Examiner* — Wei Zhao
(74) *Attorney, Agent, or Firm* — BainwoodHuang

(57) ABSTRACT

Systems and methods of performing intra-frame refresh in multimedia communications over lossy packet networks, in which a video receiver can provide packet loss feedback information to a video transmitter, and the video transmitter can respond to the feedback information, in a manner that makes efficient use of available bandwidth. By providing one or more PLI messages from the video receiver to the video transmitter based on criteria related to the detection of an eventual missing video packet and/or the determination that the quality of a current reference frame is bad, and by pausing the providing of GNACK messages from the video receiver to the video transmitter while the PLI messages are being provided to the video transmitter, the total number of video packets required for transmission/retransmission can be reduced, thereby limiting the impact of the transmitted/ retransmitted video packets on the available bandwidth while enhancing the video QoE of system users.

18 Claims, 4 Drawing Sheets

(51) Int. Cl.
   *H04N 21/24*    (2011.01)
   *H04N 21/44*    (2011.01)
   *H04N 21/442*   (2011.01)
   *H04N 21/6375*  (2011.01)
   *H04N 21/658*   (2011.01)
   *H04N 21/845*   (2011.01)

(52) U.S. Cl.
   CPC ........ *H04L 65/4092* (2013.01); *H04L 65/607* (2013.01); *H04L 65/80* (2013.01); *H04N 7/147* (2013.01); *H04N 21/2402* (2013.01); *H04N 21/44008* (2013.01); *H04N 21/44209* (2013.01); *H04N 21/6375* (2013.01); *H04N 21/6582* (2013.01); *H04N 21/8453* (2013.01)

(56) References Cited

OTHER PUBLICATIONS

Westin, Lundin, Glover, Uberti, Galligan, "RTP Payload Format for VP8 Video", draft-ietf-payload-vp8-10, Oct. 4, 2013.
Schulzrinne, Casner, Frederick, Jacobson, "RTP: A Transport Protocol for Real-Time Applications", Jul. 2003.
Alvestrand, "RTCP message for Receiver Estimated Maximum Bitrate", draft-alvestrand-rmcat-remb-03, Oct. 21, 2013.
Ott, Wenger, Sato, Burmeister, Rey, "Extended RTP Profile for Real-time Transport Control Protocol (RTCP)-Based Feedback (RTP/AVPF)", Jul. 2006.
Johansson, Westerlund, "Support for Reduced-Size Real-Time Transport Control Protocol (RTCP): Opportunities and Consequences", Apr. 2009.
Huitema, "Real Time Control Protocol (RTCP) attribute in Session Description Protocol (SDP)", Oct. 2003.
"ITU-T Telecommunication Standardization Sector of ITU H.265 (Apr. 2013)", Series H: Audiovisual and Multimedia Systems, Apr. 2013.
Bossen, Flynn, Suhring, "HM Software Manual", Jan. 25, 2013.
Grois, Marpe, Mulayoff, Itzhaky, Hadar, "Performance Comparison of H.265/MPEG-HEVC, VP9, and H.264/MPEG-AVC Encoders", Dec. 2013.

* cited by examiner

EFFECTIVE INTRA-FRAME REFRESH IN MULTIMEDIA COMMUNICATIONS OVER PACKET NETWORKS

CROSS REFERENCE TO RELATED APPLICATIONS

This application is a continuation of U.S. patent application Ser. No. 14/541,569 filed Nov. 14, 2014 entitled "Effective Intra-Frame Refresh in Multimedia Communications over Packet Networks".

TECHNICAL FIELD

The present application relates generally to systems and methods of multimedia communications over packet communications networks, and more specifically to systems and methods of performing intra-frame refresh in video communications that can recover more rapidly from video artifacts and effectively reduce the total number of video packets required for transmission and/or retransmission from a video transmitter, thereby enhancing the video quality of experience (QoE) of system users by limiting the impact of such transmitted and/or retransmitted video packets on the available bandwidth.

BACKGROUND

In recent years, multimedia communications over the Internet and other wired and/or wireless communications networks have gained increased popularity. Such multimedia communications can involve multiple participant devices performing various functions including encoding, decoding, and/or transcoding video and/or audio data streams generated by the respective participant devices. In such multimedia communications, successful transmissions of multimedia data between the participant devices over packet communications networks generally require sufficient bandwidth and low latency for minimal packet loss. Such transmissions of multimedia data are typically based on the real-time transport protocol (RTP), and the delivery of such multimedia data is typically monitored using the real-time transport control protocol (RTCP).

For example, a first participant device that receives multimedia data (such a first participant device also referred to herein as a/the "receiving participant device") in the form of RTP packets can provide packet loss feedback information to a second participant device that transmitted the multimedia data (such a second participant device also referred to herein as a/the "transmitting participant device") in one or more RTCP feedback packets. Such packet loss feedback information can take the form of a General Negative Acknowledgment (GNACK) message or a Picture Loss Indication (PLI) message. The receiving participant device can provide such a GNACK message to the transmitting participant device to identify a specific packet(s) that has/have been detected as being lost or missing, and to request the transmitting participant device to retransmit the lost or missing packet(s). Further, the receiving participant device can provide such a PLI message to the transmitting participant device to indicate the loss of an unspecified amount of packets, and to request the transmitting participant device to transmit an intra-coded video frame (such an intra-coded video frame also referred to herein as an/the "intra-frame" or "I-frame").

Multimedia communications can be problematic, however, particularly when transmissions of multimedia data are performed over public communications networks such as the Internet. For example, while engaging in multimedia communications over the Internet, various participant devices may be subjected to different levels of network congestion, which can result in reduced bandwidth, increased latency, and ultimately increased packet losses, which can severely degrade the multimedia quality of experience (QoE), or, more particularly, the video QoE, of participant users. The loss of one or more video packets at a receiving participant device can result in video QoE degradation that can persist until the next complete I-frame is received at the receiving participant device for decoding.

Moreover, conventional approaches that employ RTCP feedback packets for providing packet loss feedback information to request the retransmission of one or more lost or missing video packets, or the transmission of one or more I-frames, have frequently been incapable of achieving levels of video QoE generally desired and/or required for today's multimedia communications. For example, such conventional approaches of providing packet loss feedback information to a transmitting participant device can result in the generation of redundant requests for retransmission of lost or missing video packets and/or for transmission of I-frames, which can have a detrimental effect on the available bandwidth and exacerbate the problem of video QoE degradation.

It would therefore be desirable to have improved systems and methods of providing packet loss feedback information in multimedia communications that avoid at least some of the problems associated with such conventional approaches described herein.

SUMMARY

In accordance with the present application, systems and methods of performing intra-frame refresh in multimedia communications over lossy packet networks are disclosed, in which a video receiver can provide packet loss feedback information to a video transmitter, and the video transmitter can respond to the packet loss feedback information, in a manner that makes more efficient use of the available bandwidth from the video transmitter to the video receiver. In the disclosed systems and methods, such packet loss feedback information can take the form of real-time transport control protocol (RTCP) feedback packets including General Negative Acknowledgment (GNACK) messages and Picture Loss Indication (PLI) messages. By providing one or more PLI messages from the video receiver to the video transmitter based on certain criteria related to at least the detection of an eventual missing video packet and/or the determination that the quality of a current reference frame is bad, and by pausing the providing of GNACK messages from the video receiver to the video transmitter while the PLI messages are being provided to the video transmitter, the total number of video packets required for transmission/retransmission from the video transmitter to the video receiver can be reduced, thereby limiting the impact of such transmitted/retransmitted video packets on the available bandwidth, while enhancing the video quality of experience (QoE) of system users.

In one aspect, a system for performing intra-frame refresh in multimedia communications over lossy packet networks includes a video receiver communicably coupleable to at least one video transmitter over at least one communications network. For example, the system can be a video conferencing system or any other suitable multimedia communications system. Further, the video receiver can be a multipoint control unit (MCU) or any other suitable multimedia communications server or client, and the video transmitter can be a conference participant device or any other suitable multimedia communications client or server. The communications network can be a packet communications network such as the Internet. The video receiver includes a network packet processor, a packet parser, a frame constructor, and a video decoder. The network packet processor includes a packet receiver and a packet transmitter. The packet receiver includes a jitter buffer and a missing packet detector, and the packet transmitter includes a GNACK message transmitter and a PLI message transmitter. The packet parser includes a depacketizer, an intra-frame detector, and a reference frame quality estimator.

In an exemplary aspect, the network packet processor within the video receiver can be a real-time transport protocol (RTP) packet processor, and the video decoder within the video receiver can be an H.264 or VP8 video decoder. The video receiver is operative to receive multimedia data based on the RTP from the video transmitter, and to provide packet loss feedback information relating to the receipt of such multimedia data to the video transmitter using the RTCP. The video transmitter can send such multimedia data to the video receiver in the form of RTP packets (e.g., video packets). Further, the video receiver can receive the RTP packets, and provide the packet loss feedback information to the video transmitter in the form of RTCP feedback packets. The video transmitter can provide, to the video receiver at a predetermined RTCP transmission interval, information for use in calculating an estimate of the round trip delay in the form of RTCP sender report (SR) packets.

Having received, at the video receiver, the RTP packets and possibly one or more RTCP SR packets from the video transmitter, the network packet processor employs the jitter buffer for temporarily storing at least the RTP packets, each of which has an associated sequence number. The missing packet detector within the network packet processor inspects the sequence numbers of the respective RTP packets stored in the jitter buffer for detecting one or more eventual missing RTP packets or eventual packet loss, as well as an out-of-order arrival of RTP packets, at the video receiver. The terms "eventual missing video packet(s)" and "eventual packet loss" each relate to one or more missing packets that are not received at the video receiver even after one or more requests for retransmission of the missing packets are made by the video receiver using the GNACK message transmitter. The term "eventual missing video packet(s)" is employed herein to refer to a limited number of such missing packets, while the term "eventual packet loss" is employed herein to refer to an unspecified amount of such missing packets. In the event one or more eventual missing RTP packets are detected, the missing packet detector directs the GNACK message transmitter within the packet transmitter to transmit, over the communications network, one or more GNACK messages to the video transmitter, identifying the RTP packets that have been detected as being lost or missing at the video receiver and requesting the video transmitter to retransmit the lost or missing RTP packets. The missing packet detector also provides information pertaining to the detected eventual packet loss to the PLI message transmitter within the packet transmitter, as well as the intra-frame detector within the packet parser.

The packet parser employs the depacketizer to reconstruct data from the RTP packets stored in the jitter buffer. The depacketizer provides the reconstructed data to the intra-frame detector and the reference frame quality estimator, both of which are included in the packet parser. Having received the reconstructed data from the depacketizer, as well as the information pertaining to the detected eventual packet loss from the missing packet detector, the intra-frame detector examines at least the reconstructed data to determine whether at least one RTP packet stored in the jitter buffer is associated with an intra-coded video frame (such an intra-coded video frame also referred to herein as an/the "intra-frame" or "I-frame"), and, if so, to determine whether at least one complete I-frame or partial I-frame was stored in the jitter buffer subsequent to the detection of the eventual missing RTP packet(s). In the event an RTP packet associated with an I-frame was not stored in the jitter buffer subsequent to the detection of the eventual missing RTP packet(s), the intra-frame detector (1) directs the PLI message transmitter within the packet transmitter to transmit, over the communications network, one or more PLI messages to the video transmitter, requesting the video transmitter to transmit an I-frame to the video receiver, and (2) directs the GNACK message transmitter to pause the transmitting of GNACK messages to the video transmitter. For example, having been directed by the intra-frame detector to transmit PLI messages to the video transmitter, the PLI message transmitter can transmit such PLI messages repeatedly and/or periodically (e.g., about every 30 milliseconds). Further, having been directed by the intra-frame detector to pause the transmitting of GNACK messages to the video transmitter, the GNACK message transmitter can pause the transmitting of such GNACK messages that involve one or more RTP packets (e.g., video packets) currently stored in the jitter buffer, as well as one or more RTP packets (e.g., video packets) that might arrive at the video receiver directly thereafter within an approximate time period based at least on the estimated round trip delay.

While the PLI message transmitter transmits the PLI messages to the video transmitter, the intra-frame detector within the packet parser further examines at least the reconstructed data received from the depacketizer to determine whether at least one video packet subsequently stored in the jitter buffer is associated with an I-frame, and, if so, to determine whether at least one complete I-frame or partial I-frame was stored in the jitter buffer. In the event a complete or partial I-frame was stored in the jitter buffer, the intra-frame detector (1) directs the PLI message transmitter within the packet transmitter to stop transmitting PLI messages to the video transmitter, and (2) directs the GNACK message transmitter within the packet transmitter to resume the transmitting of GNACK messages to the video transmitter when appropriate to do so, e.g., upon detection of at least one subsequent missing packet at the video receiver. The intra-frame detector provides information pertaining to the detection of at least one complete I-frame in the jitter buffer to the reference frame quality estimator.

Having received the reconstructed data from the depacketizer and the information pertaining to the detection of a complete I-frame from the intra-frame detector, the reference frame quality estimator within the packet parser examines the reconstructed data from the depacketizer and the I-frame information from the intra-frame detector to determine the quality of a current reference frame, which can be deemed to be "good" or "bad". For example, the reference frame quality estimator can determine that the quality of the current reference frame is (1) good, if the I-frame information from the intra-frame detector indicates that the I-frame is a complete I-frame, and (2) bad, if the reconstructed data from the depacketizer indicates the detection of at least one eventual missing video packet or a bad video packet in the jitter buffer.

In the event the quality of the current reference frame is determined to be bad, the reference frame quality estimator directs the PLI message transmitter within the packet transmitter to transmit, over the communications network, one or more PLI messages to the video transmitter. Having been directed by the reference frame quality estimator to transmit the PLI messages to the video transmitter, the PLI message transmitter directs the GNACK message transmitter to pause transmitting, to the video transmitter, GNACK messages that involve RTP packets (e.g., video packets) currently stored in the jitter buffer, as well as RTP packets (e.g., video packets) that might arrive directly thereafter within an approximate time period based at least on the estimated round trip delay.

In the event the intra-frame detector subsequently detects a complete or partial I-frame stored in the jitter buffer, the PLI message transmitter can be directed to stop transmitting the PLI messages to the video transmitter, and the GNACK message transmitter can be directed to resume the transmission of GNACK messages to the video transmitter, as hereinbefore described. Further, the network packet processor can effectively remove, from the jitter buffer, all RTP packets that might have arrived at the video receiver before the detected complete or partial I-frame, allowing the video receiver to operate in a normal decoding mode. During the normal decoding mode of operation, the frame constructor within the video receiver can access the RTP packets stored in the jitter buffer, restore the proper RTP packet sequence in the case of an out-of-order arrival of RTP packets at the video receiver, construct one or more video frames using the RTP packets in their proper sequence, and provide the constructed video frames to the video decoder within the video receiver for decoding.

By providing PLI messages from a video receiver to a video transmitter based on certain criteria related to at least the detection of an eventual missing video packet(s) and/or the determination that the quality of a current reference frame is bad, and pausing the providing of GNACK messages from the video receiver to the video transmitter while the PLI messages are being provided to the video transmitter, the total number of video packets required for transmission/retransmission from the video transmitter to the video receiver can be reduced, thereby advantageously limiting the impact of such transmitted/retransmitted video packets on the available bandwidth, while advantageously enhancing the video QoE of system users.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

Systems and methods of performing intra-frame refresh in multimedia communications over lossy packet networks are disclosed, in which a video receiver can provide packet loss feedback information to a video transmitter, and the video transmitter can respond to the packet loss feedback information, in a manner that makes more efficient use of the available bandwidth from the video transmitter to the video receiver. In the disclosed systems and methods, such packet loss feedback information can take the form of real-time transport control protocol (RTCP) feedback packets including General Negative Acknowledgment (GNACK) messages and Picture Loss Indication (PLI) messages. By providing one or more PLI messages from the video receiver to the video transmitter based on certain criteria related to at least the detection of an eventual missing video packet and/or the determination that the quality of a current reference frame is bad, and by pausing the providing of GNACK messages from the video receiver to the video transmitter while the PLI messages are being provided to the video transmitter, recovery from video artifacts can be achieved more rapidly and the total number of video packets required for transmission/retransmission from the video transmitter to the video receiver can be reduced, thereby enhancing the video quality of experience (QoE) of system users by limiting the impact of such transmitted/retransmitted video packets on the available bandwidth.

Figure 1:
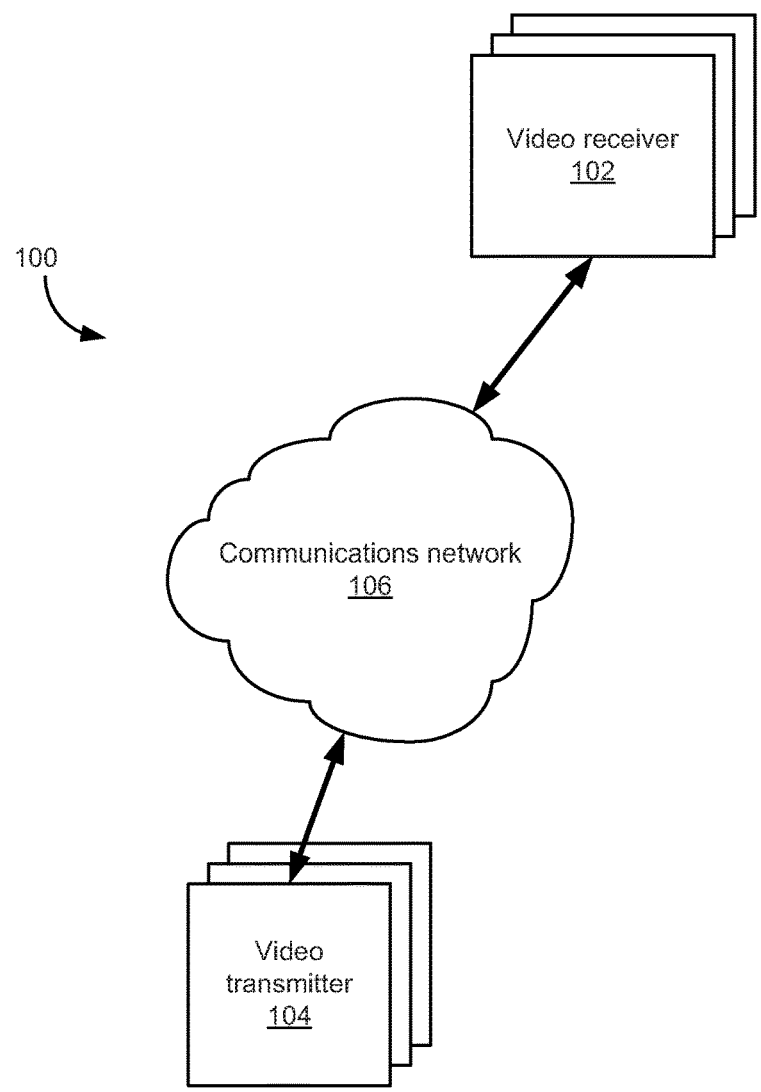
FIG. 1 is a block diagram of an exemplary communications system for performing intra-frame refresh in multimedia communications, including at least one exemplary video receiver communicably coupleable to at least one exemplary video transmitter over an exemplary communications network, in accordance with the present application.

FIG. 1 depicts an illustrative embodiment of an exemplary communications system 100 for performing intra-frame refresh in multimedia communications over lossy packet networks, in accordance with the present application. As shown in FIG. 1, the system 100 includes at least one video receiver 102 communicably coupleable to at least one video transmitter 104 over a communications network 106. For example, the system 100 can be a video conferencing system or any other suitable multimedia communications system. Further, the video receiver 102 can be a multipoint control unit (MCU) or any other suitable multimedia communications server or client, and the video transmitter 104 can be a conference participant device or any other suitable multimedia communications client or server. The communications network 106 can be a packet communications network such as the Internet.

Figure 2:
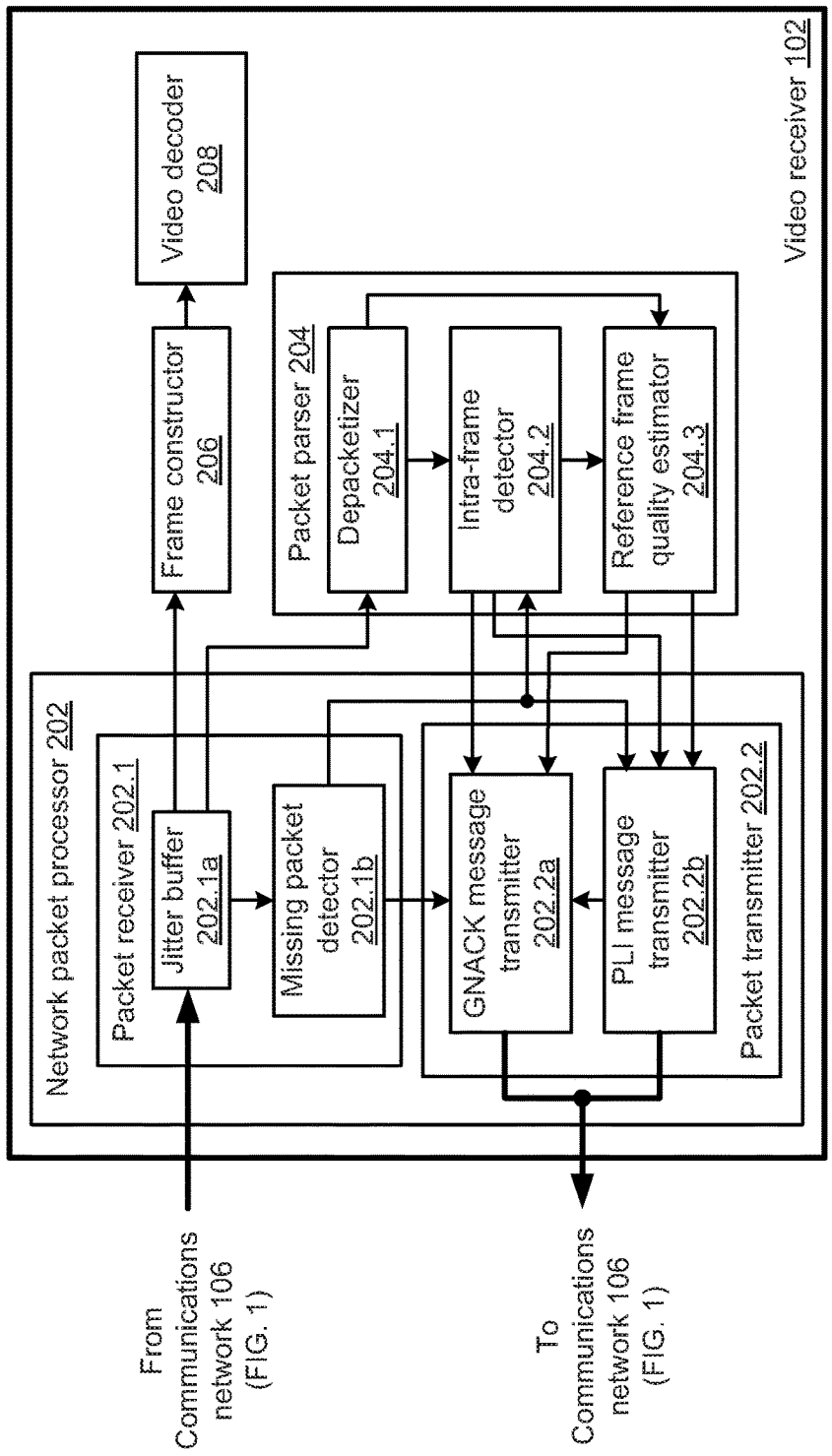
FIG. 2 is a block diagram of the video receiver of FIG. 1.

FIG. 2 depicts a detailed view of the video receiver 102 of FIG. 1. As shown in FIG. 2, the video receiver 102 has a plurality of functional components, including a network packet processor 202, a packet parser 204, a frame constructor 206, and a video decoder 208. For example, the network packet processor 202 can be a real-time transport protocol (RTP) packet processor or any other suitable processor, and the video decoder 208 can be an H.264 or VP8 video decoder or any other suitable decoder. The network packet processor 202 has a plurality of functional sub-components, including at least a packet receiver 202.1 and a packet transmitter 202.2. The packet receiver 202.1 includes at least a jitter buffer 202.1a and a missing packet detector 202.1b, and the packet transmitter 202.2 includes at least a GNACK message transmitter 202.2a and a PLI message transmitter 202.2b. The packet parser 204 likewise has a plurality of functional sub-components, including at least a depacketizer 204.1, an intra-frame detector 204.2, and a reference frame quality estimator 204.3.

It is noted that the intra-frame detector 204.2 can be included in the packet parser 204 to reduce the time required for the intra-frame detector 204.2 to inform the PLI message transmitter 202.2b of the detection of an intra-coded video frame (such an intra-coded video frame also referred to herein as an/the "intra-frame" or "I-frame") in the jitter buffer 202.1a. It is further noted that the missing packet detector 202.1b can be included in the network packet processor 202 to reduce the time required for the missing packet detector 202.1b to provide information pertaining to the detection of a missing RTP packet(s), an eventual missing video packet(s), and/or eventual packet loss to the PLI message transmitter 202.2b and/or the intra-frame detector 204.2. The terms "eventual missing video packet(s)" and "eventual packet loss" each relate to one or more missing packets that are not received at the video receiver even after one or more requests for retransmission of the missing packets are made by the video receiver using the GNACK message transmitter 202.2a. The term "eventual missing video packet(s)" is employed herein to refer to a limited number of such missing packets, while the term "eventual packet loss" is employed herein to refer to an unspecified amount of such missing packets.

The video receiver 102 is operative to receive multimedia data based on the RTP from the video transmitter 104, and to provide packet loss feedback information relating to the receipt of such multimedia data to the video transmitter 104 using the RTCP. Such packet loss feedback information is defined in *RTP: A Transport Protocol for Real-Time Applications*, Copyright© The Internet Society, July 2003, which is hereby incorporated herein by reference in its entirety. The video transmitter 104 can send such multimedia data to the video receiver 102 in the form of RTP packets (e.g., video packets). Further, the video receiver 102 can receive the RTP packets, and provide the packet loss feedback information to the video transmitter 104 in the form of RTCP feedback packets. The video transmitter 104 can provide, to the video receiver 102 at a predetermined RTCP transmission interval, information for use in calculating an estimate of the round trip delay in the form of RTCP sender report (SR) packets.

In one mode of operation, having received, at the video receiver 102 over the communications network 106, one or more RTP packets and possibly one or more RTCP SR packets from the video transmitter 104, the network packet processor 202 employs the jitter buffer 202.1a for temporarily storing at least the RTP packets, each of which has an associated sequence number. The missing packet detector 202.1b inspects the sequence numbers of the respective RTP packets stored in the jitter buffer 202.1a for detecting one or more eventual missing RTP packets or eventual packet loss, as well as an out-of-order arrival of RTP packets, at the video receiver 102. In the event one or more eventual missing RTP packets are detected, the missing packet detector 202.1b directs the GNACK message transmitter 202.2a to transmit, over the communications network 106, one or more GNACK messages to the video transmitter 104, identifying the RTP packets that have been detected as being lost or missing at the video receiver 102, and requesting the video transmitter 104 to retransmit the lost or missing RTP packets. The missing packet detector 202.1b also provides information pertaining to the detected eventual packet loss to the PLI message transmitter 202.2b and/or the intra-frame detector 204.2.

The packet parser 204 employs the depacketizer 204.1 to reconstruct data from the RTP packets stored in the jitter buffer 202.1a. The depacketizer 204.1 provides the reconstructed data to the intra-frame detector 204.2 and the reference frame quality estimator 204.3. Having received the reconstructed data from the depacketizer 204.1, as well as the information pertaining to the detected eventual packet loss from the missing packet detector 202.1b, the intra-frame detector 204.2 examines at least the reconstructed data to determine whether at least one RTP packet stored in the jitter buffer 202.1a is associated with an I-frame. In the event it is determined that at least one RTP packet stored in the jitter buffer 202.1a is associated with an I-frame, the intra-frame detector 204.2 further examines at least the reconstructed data to determine whether at least one complete I-frame or partial I-frame was stored in the jitter buffer 202.1a subsequent to the detection of the eventual missing RTP packet(s) by the missing packet detector 202.1b.

In the event it is determined that an RTP packet associated with an I-frame was not stored in the jitter buffer 202.1a subsequent to the detection of the eventual missing RTP packet(s), the intra-frame detector 204.2 (1) directs the PLI message transmitter 202.2b to transmit, over the communications network 106, one or more PLI messages to the video transmitter 104, requesting the video transmitter 104 to transmit an I-frame to the video receiver 102, and (2) directs the GNACK message transmitter 202.2a to pause the transmitting of GNACK messages to the video transmitter 104. For example, having been directed by the intra-frame detector 204.2 to transmit PLI messages to the video transmitter 104, the PLI message transmitter 202.2b can transmit such PLI messages repeatedly and/or periodically (e.g., about every 30 milliseconds). Further, having been directed by the intra-frame detector 204.2 to pause the transmitting of GNACK messages to the video transmitter 104, the GNACK message transmitter 202.2a can pause the transmitting of such GNACK messages that involve one or more RTP packets (e.g., video packets) currently stored in the jitter buffer 202.1a, as well as one or more RTP packets (e.g., video packets) that might arrive at the video receiver 102 directly thereafter within an approximate time period based at least on the estimated round trip delay.

While the PLI message transmitter 202.2b transmits the PLI messages to the video transmitter 104, the intra-frame detector 204.2 further examines at least the reconstructed data received from the depacketizer 204.1 to determine whether at least one video packet subsequently stored in the jitter buffer 202.1a is associated with an I-frame. In the event it is determined that at least one video packet subsequently stored in the jitter buffer 202.1a is associated with an I-frame, the intra-frame detector 204.2 further examines at least the reconstructed data to determine whether at least one complete I-frame or partial I-frame was stored in the jitter buffer 202.1a. In the event it is determined that a complete or partial I-frame was stored in the jitter buffer 202.1a, the intra-frame detector 204.2 (1) directs the PLI message transmitter 202.2b to stop transmitting PLI messages to the video transmitter 104, and (2) directs the GNACK message transmitter 202.2a to resume the transmitting of GNACK messages to the video transmitter 104 when appropriate to do so, e.g., upon detection of at least one subsequent missing packet at the video receiver 102. The intra-frame detector 204.2 provides information pertaining to the detection of at least one complete I-frame in the jitter buffer 202.1a to the reference frame quality estimator 204.3.

Having received the reconstructed data from the depacketizer 204.1 and the information pertaining to the detection of a complete I-frame from the intra-frame detector 204.2, the reference frame quality estimator 204.3 examines the reconstructed data from the depacketizer 204.1 and the I-frame information from the intra-frame detector 204.2 to determine the quality of a current reference frame, which can be deemed to be "good" or "bad". For example, the reference frame quality estimator 204.3 can determine that the quality of the current reference frame is (1) good, if the I-frame information from the intra-frame detector 204.2 indicates that the I-frame is a complete I-frame, and (2) bad, if the reconstructed data from the depacketizer 204.1 indicates the detection of at least one eventual missing video packet or a bad video packet in the jitter buffer 202.1a.

In the event it is determined that the quality of the current reference frame is bad, the reference frame quality estimator 204.3 directs the PLI message transmitter 202.2b to transmit, over the communications network 106, one or more PLI messages to the video transmitter 104. Having been directed by the reference frame quality estimator 204.3 to transmit the PLI messages to the video transmitter 104, the PLI message transmitter 202.2b directs the GNACK message transmitter 202.2a to pause transmitting, to the video transmitter 104, GNACK messages that involve RTP packets (e.g., video packets) currently stored in the jitter buffer 202.1a, as well as RTP packets (e.g., video packets) that might arrive directly thereafter within an approximate time period based at least on the estimated round trip delay.

In the event the intra-frame detector 204.2 subsequently detects a complete or partial I-frame stored in the jitter buffer 202.1a, the intra-frame detector 204.2 can direct the PLI message transmitter 202.2b to stop transmitting the PLI messages to the video transmitter 104, and direct the GNACK message transmitter 202.2a to resume the transmission of GNACK messages to the video transmitter 104, as hereinbefore described. Further, the network packet processor 202 can effectively remove, from the jitter buffer 202.1a, all RTP packets that might have arrived at the video receiver 102 before the detected complete or partial I-frame, allowing the video receiver 102 to operate in a normal decoding mode. During such a normal decoding mode of operation, the frame constructor 206 can access the RTP packets stored in the jitter buffer 202.1a, restore the proper RTP packet sequence in the case of an out-of-order arrival of RTP packets at the video receiver 102, construct one or more video frames using the RTP packets in their proper sequence, and provide the constructed video frames to the decoder 208 for decoding.

Figure 3:
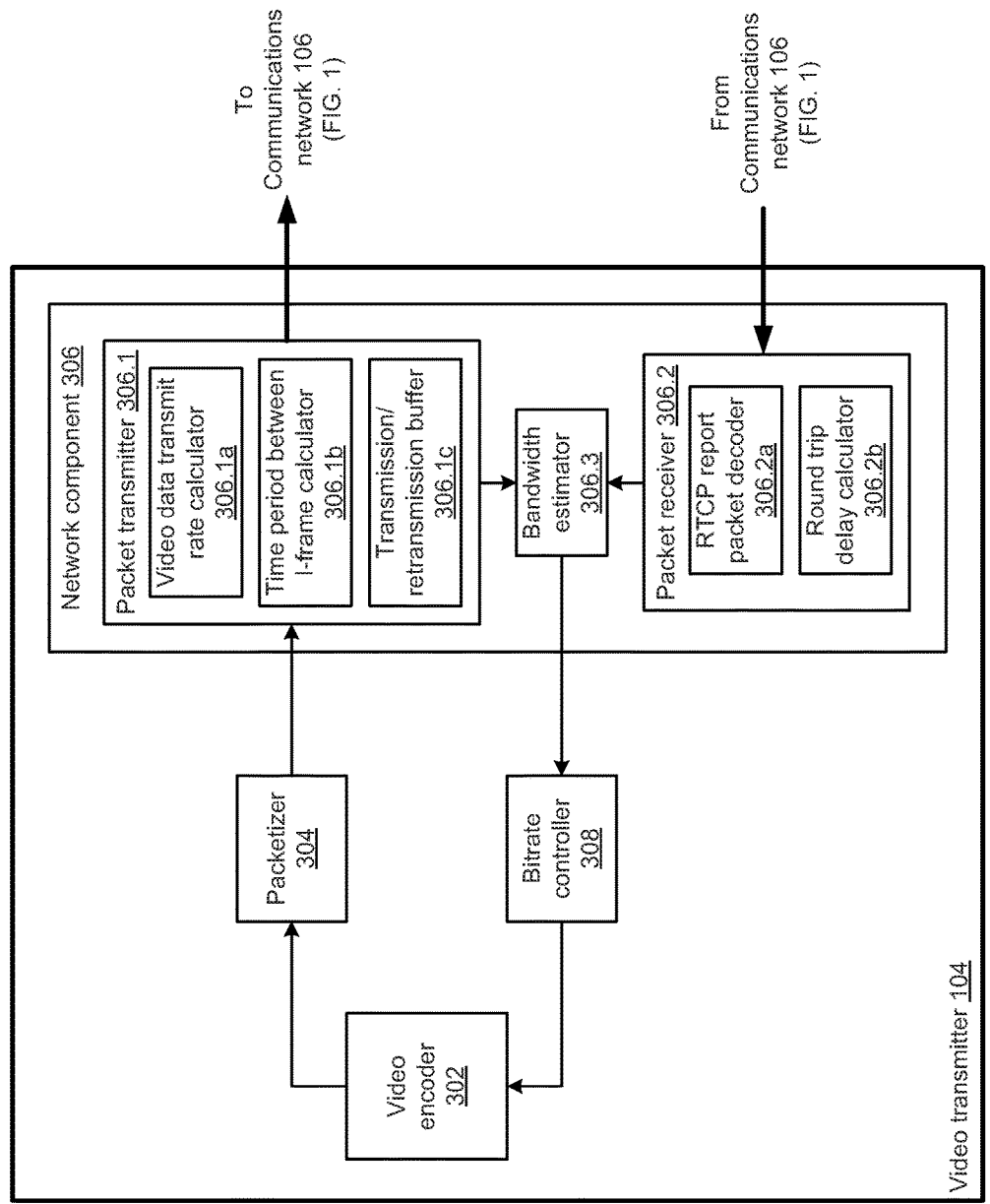
FIG. 3 is a block diagram of the video transmitter of FIG. 1.

FIG. 3 depicts a detailed view of the video transmitter 104 of FIG. 1. As shown in FIG. 3, the video transmitter 104 has a plurality of functional components, including at least a video encoder 302, a packetizer 304, a bitrate controller 308, and a network component 306 operative at least (1) to estimate the available bandwidth from the video transmitter 104 to the video receiver 102, and (2) to calculate a time period between I-frames transmitted from the video transmitter 104 to the video receiver 102. The network component 306 has a plurality of functional sub-components, including at least a packet transmitter 306.1, a packet receiver 306.2, and a bandwidth estimator 306.3. The packet transmitter 306.1 includes at least a video data transmit rate calculator 306.1a, a time period between I-frame calculator 306.1b, and a transmission/retransmission buffer 306.1c. The packet receiver 306.2 includes at least an RTCP report packet decoder 306.2a and a round trip delay calculator 306.2b.

Having been directed by the intra-frame detector 204.2 to transmit one or more PLI messages, the PLI message transmitter 202.2b transmits, over the communications network 106, the respective PLI messages to the video transmitter 104. Packet loss feedback information in the form of RTCP feedback packets containing the PLI messages is received, over the communications network 106, at the RTCP report packet decoder 306.2a, which decodes the RTCP feedback packets containing the PLI messages. Using at least some of the packet loss feedback information, the round trip delay calculator 306.2b can calculate the round trip delay between the video transmitter 104 and the video receiver 102, and provide an indication of the calculated round trip delay to the bandwidth estimator 306.3.

The video encoder 302 within the video transmitter 104 can encode a video data stream at a target bitrate determined by the bitrate controller 308, and provide the encoded video data stream to the packetizer 304. The packetizer 304 can provide RTP packets, corresponding to the encoded video data stream, to the packet transmitter 306.1 for subsequent transmission, over the communications network 106, to the video receiver 102 at a video data transmit rate commensurate with the target bitrate of the video encoder 302. The video data transmit rate calculator 306.1a can receive the RTP packets from the packetizer 304, calculate the video data transmit rate to be used in transmitting the RTP packets to the video receiver 102, and provide the calculated video data transmit rate to the bandwidth estimator 306.3.

Using at least the packet loss feedback information from the RTCP report packet decoder 306.2a, the calculated round trip delay from the round trip delay calculator 306.2b, and the calculated video data transmit rate from the video data transmit rate calculator 306.1a, the bandwidth estimator 306.3 can calculate, determine, or otherwise obtain an estimate of the available bandwidth from the video transmitter 104 to the video receiver 102, and provide an indication of the available bandwidth estimate to the bitrate controller 308 for subsequent use in determining the target bitrate for encoding the video data stream. In one embodiment, the bandwidth estimator 306.3 can compare a value of the available bandwidth estimate with a value of the receiver estimated maximum bitrate (the receiver estimated maximum bitrate also referred to herein as the "REMB bitrate") provided with the feedback information, and select one of these two values as the estimate of the available bandwidth. The REMB bitrate is defined in *RTCP message for Receiver Estimated Maximum Bitrate*, Copyright© 2013 IETF Trust and the persons identified as the document authors, which is hereby incorporated herein by reference in its entirety.

Having received, at the video transmitter 104, at least one PLI message from the PLI message transmitter 202.2b, the bitrate controller 308 can determine whether there is a sufficient available bandwidth for the packet transmitter 306.1 to transmit an I-frame to the video receiver 102, based at least on the estimate of the available bandwidth provided by the bandwidth estimator 306.3. In the event the available bandwidth is determined to be sufficient for successfully transmitting the I-frame, the packet transmitter 306.1 transmits, over the communications network 106, the I-frame to the video receiver 102 at the video data transmit rate. In the event the available bandwidth is determined to be insufficient for successfully transmitting the I-frame, the bitrate controller 308 can reduce, at least temporarily, the target bitrate by a predetermined amount, thereby causing the video encoder 302 in concert with the packetizer 304 to generate the I-frame with fewer bytes of information. In this way, the possibility of successfully transmitting the I-frame from the video transmitter 104 to the video receiver 102 with minimal or no packet loss can be increased.

Figure 4:
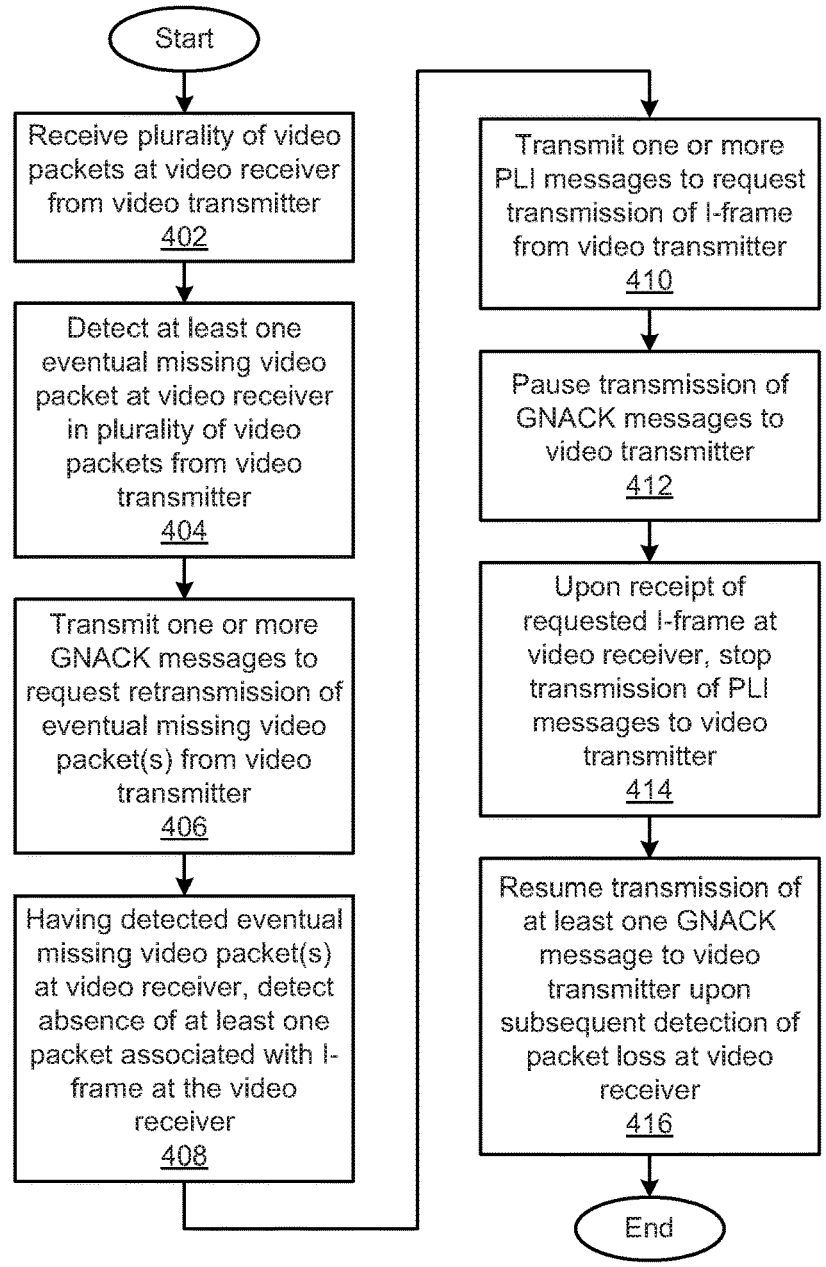
FIG. 4 is a flow diagram illustrating an exemplary method of performing intra-frame refresh in multimedia communications involving the video receiver of FIG. 1 and the video transmitter of FIG. 1.

A method of performing intra-frame refresh in multimedia communications over lossy packet networks is described herein with reference to FIGS. 1, 2, and 4. As depicted in block 402 (see FIG. 4), a plurality of video packets are received at the video receiver 102 (see FIG. 1) from the video transmitter 104 (see FIG. 1). As depicted in block 404 (see FIG. 4), at least one eventual missing video packet is detected, at the video receiver 102, in the plurality of video packets from the video transmitter 104. As depicted in block 406 (see FIG. 4), one or more GNACK messages are transmitted, by the video receiver 102, to request the retransmission of the eventual missing video packet(s) from the video transmitter 104. As depicted in blocks 408, 410, and 412 (see FIG. 4), having detected the eventual missing video packet(s) at the video receiver 102, (1) the absence of at least one packet associated with an I-frame is detected at the video receiver 102 (see block 408; FIG. 4), (2) one or more PLI messages are transmitted, by the video receiver 102, to request the transmission of an I-frame from the video transmitter 104 (see block 410; FIG. 4), and (3) the transmitting of the GNACK messages to the video transmitter 104 is paused (see block 412; FIG. 4). As depicted in blocks 414 and 416 (see FIG. 4), upon receipt of the requested I-frame at the video receiver 102, (1) the transmitting of the one or more PLI messages to the video transmitter 104 is stopped (see block 414; FIG. 4), and (2) the transmission of at least one GNACK message to the video transmitter 104 is resumed upon subsequent detection of packet loss at the video receiver 102 (see block 416; FIG. 4).

Having described the above illustrative embodiments, other alternative embodiments are possible, and/or variations to these illustrative embodiments may be made. For example, it was described herein that the network packet processor 202 within the video receiver 102 can employ the jitter buffer 202.1a for temporarily storing RTP packets received from the video transmitter 104. In a conventional communications system, the size of such a jitter buffer is typically set to store an amount of packets expected to be received at a video receiver within a predetermined time interval, such as one (1) second. In one embodiment, the video receiver 102 can be configured to variably set the size of the jitter buffer 202.1a based at least on the round trip delay between the video transmitter 104 and the video receiver 102, and/or the target bitrate used by the video encoder 302 for encoding a video data stream.

It was further described herein that, if it is determined that an RTP packet associated with an I-frame was not stored in the jitter buffer 202.1a subsequent to the detection of an eventual missing RTP packet(s), then the intra-frame detector 204.2 can direct the PLI message transmitter 202.2b to transmit, over the communications network 106, one or more PLI messages repeatedly and/or periodically to the video transmitter 104. In one embodiment, the PLI message transmitter 202.2b is operative to adjust a time interval for transmitting such PLI messages based at least on the possible availability of extra bandwidth in excess of the current available bandwidth from the video receiver 102 to the video transmitter 104, and/or the round trip delay between the video receiver 102 and the video transmitter 104. Such a possible availability of extra bandwidth can be determined at the video receiver 102 based at least on (1) the current available bandwidth from the video transmitter 104 to the video receiver 102, (2) the video frame size in use, and/or (3) the packet loss ratio (e.g., the ratio of the lost or missing packet count to the expected packet count). For example, as the available bandwidth from the video transmitter 104 to the video receiver 102 increases, the possible availability of extra bandwidth from the video transmitter 104 to the video receiver 102 is likely to increase. Further, for a given available bandwidth, the use of a smaller video frame size is likely to increase the possible availability of extra bandwidth. In addition, a smaller packet loss ratio is likely to result in an increase in the possible availability of extra bandwidth.

Such an adjustable time interval, $T_{PLI}$, for transmitting PLI messages from the PLI message transmitter 202.2b to the video transmitter 104 can be expressed, in the form of a function, $f(\ldots)$, as follows:

$$T_{PLI} = f(B_{est}, F_{size}, R_{packet\_loss}, D_{RT}) \quad (1)$$

in which "$B_{est}$" is the estimated available bandwidth, "$F_{size}$" is the video frame size in use, "$R_{packet\_loss}$" is the packet loss ratio, and "$D_{RT}$" is the round trip delay. In one embodiment, the adjustable time interval, $T_{PLI}$, can be further expressed, as follows:

$$T_{PLI} = 20 + 0.2 * D_{RT} + 100 * R_{packet\_loss} + 10 * \sqrt{F_{size}/B_{est}}. \quad (2)$$

Accordingly, based at least on the estimated available bandwidth, $B_{est}$, the video frame size, $F_{size}$, the packet loss ratio, $R_{packet\_loss}$, and/or the round trip delay, $D_{RT}$, the PLI message transmitter 202.2b can adjust the time interval, $T_{PLI}$, for transmitting PLI messages to the video transmitter 104, while taking into account the possible availability of extra bandwidth in excess of the current available bandwidth from the video transmitter 104 to the video receiver 102.

It was further described herein that, in the event it is determined that a complete or partial I-frame is stored in the jitter buffer 202.1a, the intra-frame detector 204.2 can direct the PLI message transmitter 202.2b to stop transmitting PLI messages to the video transmitter 104, and direct the GNACK message transmitter 202.2a to resume or restart the transmitting of GNACK messages to the video transmitter 104 when appropriate to do so. In one embodiment, the video receiver 102 can employ a predetermined wait time, based at least on the round trip delay, for the receipt of one or more RTP packets requested for transmission/retransmission from the video transmitter 104. Such a predetermined wait time, $T_{wait}$, can be increased for packets associated with the first I-frame after the restart, as follows:

$$T_{wait} = k * T_{wait\_org} \quad (3)$$

in which "$T_{wait\_org}$" is the wait time normally used before the increase in wait time, and "k" is a constant that can be set to 1.5 or any other suitable value. The wait time, $T_{wait}$, at the video receiver 102 can be increased for RTP packets associated with an I-frame transmitted by the video transmitter 104 after the restart of the transmission of GNACK messages by the video receiver 102, thereby increasing the possibility of receiving the complete I-frame at the video receiver 102.

It is noted that an I-frame can be transmitted by the video transmitter 104 in response to a GNACK message from the video receiver 102, in the event a lost or missing packet requested for retransmission is found not to exist in the transmission/retransmission buffer 306.1c. In this way, the video transmitter 104 can avoid a further wait time for a PLI message from the video receiver 102 before transmitting the I-frame, reducing the degradation that such further waiting can have on the video QoE.

It was further described herein that, having been directed by the intra-frame detector 204.2 to transmit PLI messages to the video transmitter 104, the PLI message transmitter 202.2b can transmit such PLI messages repeatedly and/or periodically until an I-frame is received at the video receiver 102. In one embodiment, having received multiple PLI messages from the video receiver 102, the video transmitter 104 can avoid the possibility of transmitting redundant I-frames by calculating, using the time period between I-frame calculator 306.1b, a time period, $T_{prev\_intra}$, between successive transmissions of I-frames, and by transmitting a subsequent I-frame if the following conditions are met:

$$T_{prev\_intra} > T_{min}, \text{ and} \quad (4)$$

$$T_{prev\_intra} > \alpha + \beta * D_{RT} \quad (5)$$

in which "$T_{min}$" can be set to 200 milliseconds or any other suitable value, "α" can be set to 50 milliseconds or any other suitable value, "β" is a constant that can be set to 1.5 or any other suitable value, and "$D_{RT}$" is the round trip delay. If the conditions defined by equations (4) and (5) are not met, then the video transmitter 104 can ignore the PLI message(s) from the video receiver 102. In this way, the video transmitter 104 can avoid sending a subsequent I-frame before the previous I-frame is received at the video receiver 102, reducing the detrimental effects that the transmission of redundant I-frames can have on the available bandwidth.

It is noted that the operations described herein are purely exemplary and imply no particular order. Further, the operations can be used in any sequence when appropriate and can be partially used. With the above illustrative embodiments in mind, it will be appreciated that the disclosed systems and methods can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Any of the operations described herein that form part of the disclosed systems and methods are useful machine operations. The disclosed systems and methods also relate to a device(s) or apparatus(es) for performing these operations. The apparatuses can be specially constructed for the required purpose, or the apparatuses can be general-purpose computers selectively activated or configured by computer programs stored in the computers. In particular, various general-purpose machines employing one or more processors coupled to one or more memories or other computer readable media can be used with computer programs written in accordance with the teachings set forth herein, or it may be more convenient to construct more specialized apparatuses to perform the required operations.

The disclosed systems and methods can also be embodied as computer readable code on computer readable media. The computer readable media can be any data storage device(s) that can store data, which can thereafter be read by a computer system. Examples of such computer readable media include hard drives, read-only memory (ROM), random-access memory (RAM), CD-ROMs, CD-Rs, CD-RWs, magnetic tapes, and/or other optical and/or non-optical storage devices. The computer readable media can also be distributed over network-coupled computer systems so that the computer readable code can be stored and executed in a distributed fashion.

It will be further appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of performing intra-frame refresh in multimedia communications between a video transmitter and a video receiver over a packet communications network, the method comprising:
   detecting, at the video receiver, at least one eventual missing video packet in a plurality of video packets from the video transmitter, the at least one eventual missing video packet corresponding to at least one missing packet not received at the video receiver after a predetermined wait time has passed;
   having detected the eventual packet loss at the video receiver:
      detecting an absence of at least one packet associated with an intra-frame after the at least one eventual missing video packet in the plurality of video packets from the video transmitter is detected; and
      transmitting, by the video receiver, one or more feedback packets to the video transmitter to request transmission of an intra-frame while decoding of the plurality of video packets at the video receiver is paused; and
   upon receipt of the requested intra-frame at the video receiver, stopping the transmitting of the one or more feedback packets to the video transmitter while the decoding of the plurality of video packets at the video receiver is resumed.

2. The method of claim 1 further comprising:
   determining a quality of a current reference frame at the video receiver.

3. The method of claim 2 further comprising:
   assigning a first quality designation to the current reference frame in the event a complete intra-frame is received at the video receiver; and
   assigning a second quality designation to the current reference frame in the event of (1) the subsequent detection of packet loss at the video receiver, or (2) detection of a bad packet at the video receiver.

4. The method of claim 3 further comprising:
   having assigned the second quality designation to the current reference frame:
   transmitting, by the video receiver, one or more additional feedback packets to the video transmitter to request transmission of a further intra-frame while the decoding of the plurality of video packets at the video receiver is paused.

5. The method of claim 4 further comprising:
   upon receipt of the requested further intra-frame at the video receiver, stopping the transmitting of the one or more additional feedback packets to the video transmitter while the decoding of the plurality of video packets at the video receiver is resumed.

6. A system for performing intra-frame refresh in multimedia communications over a packet communications network, comprising:
   a video receiver including a video decoder, a network packet processor, and a packet parser,
   wherein the network packet processor includes a jitter buffer, a missing packet detector, and a feedback packet transmitter,
   wherein the packet parser includes an intra-frame detector,
   wherein the missing packet detector is configured to detect at least one eventual missing video packet among a plurality of video packets in the jitter buffer, the at least one eventual missing video packet corresponding to at least one missing packet not received at the video receiver after a predetermined wait time has passed;

wherein, upon detection of the eventual packet loss at the video receiver, the intra-frame detector is configured:
to detect an absence of at least one packet associated with an intra-frame in the jitter buffer after the at least one eventual missing video packet in the plurality of video packets in the jitter buffer is detected; and
to direct the feedback packet transmitter to transmit one or more feedback packets to the video transmitter to request transmission of an intra-frame while decoding of the plurality of video packets by the video decoder is paused; and
upon receipt of the requested intra-frame, to direct the feedback packet transmitter to stop transmitting the one or more feedback packets to the video transmitter while the decoding of the plurality of video packets by the video decoder is resumed.

7. The system of claim 6 wherein the packet parser further includes a reference frame quality estimator configured to determine a quality of a current reference frame at the video receiver.

8. The system of claim 7 wherein the reference frame quality estimator is further configured to assign a first quality designation to the current reference frame in the event a complete intra-frame is received at the video receiver, and to assign a second quality designation to the current reference frame in the event of (1) the subsequent detection of packet loss at the video receiver, or (2) detection of a bad packet at the video receiver.

9. The system of claim 8 wherein, having assigned the second quality designation to the current reference frame, the intra-frame detector is further configured to direct the feedback packet transmitter to transmit one or more additional feedback packets to the video transmitter to request transmission of a further intra-frame while the decoding of the plurality of video packets at the video receiver is paused.

10. The system of claim 9 wherein, upon receipt of the requested further intra-frame at the video receiver, the intra-frame detector is further configured to direct the feedback packet transmitter to stop transmitting of the one or more additional feedback packets to the video transmitter while the decoding of the plurality of video packets at the video receiver is resumed.

11. The system of claim 6 wherein the network packet processor is configured to remove, from the jitter buffer, one or more video packets arriving before the receipt of the requested intra-frame at the video receiver.

12. The system of claim 11 wherein the video receiver further includes frame constructor configured to construct one or more video frames from one or more video packets remaining at the jitter buffer subsequent to the removing of the one or more video packets from the jitter buffer.

13. The system of claim 6 wherein the network packet processor is configured to adjust a size of the jitter buffer based at least on one or more of a round trip delay between the video transmitter and the video receiver, and a target bitrate used by the video transmitter for encoding a video data stream.

14. The system of claim 6 wherein the feedback packet transmitter is configured to adjust a time interval for transmitting the one or more feedback packets to the video transmitter based at least on one or more of an available bandwidth from the video transmitter to the video receiver, a video frame size in use by the video receiver, and a packet loss ratio from the video transmitter.

15. A system for performing intra-frame refresh in multimedia communications over a packet communications network, comprising:
a video transmitter including a video encoder, a packetizer, and a packet transmitter,
wherein the video encoder is configured to encode a video data stream at a target bitrate,
wherein the packetizer is configured to generate a plurality of video packets corresponding to the encoded video data stream, and
wherein the packet transmitter is configured to transmit the plurality of video packets over the packet communications network at a video data transmit rate;
a video receiver including a video decoder, a network packet processor, and a packet parser,
wherein the network packet processor includes a jitter buffer, a missing packet detector, and a feedback packet transmitter,
wherein the video receiver is configured to receive the plurality of video packets in the jitter butter,
wherein the packet parser includes an intra-frame detector,
wherein the missing packet detector is configured to detect at least one eventual missing video packet among the plurality of video packets in the jitter buffer, the at least one eventual missing video packet corresponding to at least one missing packet not received at the video receiver after a predetermined wait time has passed;
wherein, upon detection of the eventual packet loss at the video receiver, the intra-frame detector is configured:
to detect an absence of at least one packet associated with an intra-frame in the jitter buffer after the at least one eventual missing video packet in the plurality of video packets in the jitter buffer is detected; and
to direct the feedback packet transmitter to transmit one or more feedback packets to the video transmitter to request transmission of an intra-frame while decoding of the plurality of video packets by the video decoder is paused; and
upon receipt of the requested intra-frame from the video transmitter, to direct the second feedback packet transmitter to stop transmitting the one or more feedback packets while the decoding of the plurality of video packets by the video decoder is resumed.

16. The system of claim 15 wherein the video transmitter further includes a bandwidth estimator and a bitrate controller, wherein the bandwidth estimator is configured to estimate an available bandwidth from the video transmitter to the video receiver, and wherein the bitrate controller is configured, in the event the available bandwidth is insufficient for transmitting the requested intra-frame to the video receiver, to reduce the target bitrate by a predetermined amount to allow the video encoder and the packetizer to generate the requested intra-frame from the encoded video data stream with fewer bytes of information.

17. The system of claim 15 wherein the video transmitter further includes a retransmission buffer, and wherein, in the event the eventual missing video packet is absent from the retransmission buffer, the video encoder and the packetizer are configured to generate a further intra-frame from the encoded video data stream for subsequent transmission to the video receiver.

18. The system of claim 15 wherein the video transmitter is configured to determine a time period since transmission of a last intra-frame by the packet transmitter to the video receiver, and wherein the packet transmitter is further configured to transmit a further intra-frame to the video receiver in the event the time period since the transmission of the last intra-frame satisfies one or more conditions based at least on a round trip delay between the video transmitter and the video receiver.

* * * * *